(12) United States Patent
Lapp et al.

(10) Patent No.: US 12,449,249 B1
(45) Date of Patent: Oct. 21, 2025

(54) SENSOR ASSEMBLY FOR A STEERING CONTROL LEVER OF A MOWER

(71) Applicant: Parker-Hannifin Corporation, Cleveland, OH (US)

(72) Inventors: Anthony Lapp, Grand Blanc, MI (US); Jason S. Richardson, Chuckey, TN (US); Randall D. Thompson, Lancaster, SC (US); Kyle J. Merrill, Chuckey, TN (US); Todd A. Link, Gray, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 57 days.

(21) Appl. No.: 18/503,263

(22) Filed: Nov. 7, 2023

Related U.S. Application Data (60) Provisional application No. 63/484,765, filed on Feb. 14, 2023.

(51) Int. Cl.
| | |
|---|---|
| *G01B 7/30* | (2006.01) |
| *A01D 34/78* | (2006.01) |
| *A01D 34/82* | (2006.01) |
| *A01D 101/00* | (2006.01) |
| *G01D 5/14* | (2006.01) |

(52) U.S. Cl.
CPC .............. *G01B 7/30* (2013.01); *A01D 34/78* (2013.01); *A01D 34/824* (2013.01); *G01D 5/14* (2013.01); *A01D 2101/00* (2013.01)

(58) Field of Classification Search
CPC . G01B 7/30; G01D 5/14; A01D 34/78; A01D 34/824; A01D 2101/00; A01D 69/02; E02F 9/166; B62D 1/12; B62D 1/14; B62D 11/04; B62D 11/003; B62D 5/001; B60K 26/02; B60K 26/04; B60K 2026/046; B60R 16/0231; B60T 7/102
See application file for complete search history.

(56) References Cited

U.S. PATENT DOCUMENTS

| | | | |
|---|---|---|---|
| 5,502,957 A * | 4/1996 | Robertson | A01D 34/6806 56/10.2 G |
| 6,708,794 B2 * | 3/2004 | Menjak | B62D 5/001 180/444 |
| 6,870,364 B2 * | 3/2005 | Sekiya | G01D 5/145 324/207.2 |
| 7,343,994 B2 * | 3/2008 | Wakitani | B60W 10/26 37/246 |

(Continued)

FOREIGN PATENT DOCUMENTS

| | | |
|---|---|---|
| CN | 105917841 A | 9/2016 |
| JP | 2015216039 A | 12/2015 |

*Primary Examiner* — Timothy Wilhelm
(74) *Attorney, Agent, or Firm* — McDonnell Boehnen Hulbert & Berghoff LLP (57) ABSTRACT

An example sensor assembly includes: a rotary displacement amplifier configured to be coupled to a lap bar of a mower and configured to amplify movement of the lap bar; and a rotary sensor comprising a sensor shaft coupled to, and rotatable by, the rotary displacement amplifier, wherein the rotary displacement amplifier is configured to transmit an amplified movement of the lap bar to the sensor shaft, and wherein the rotary sensor is configured to provide a signal indicative of a rotary position of the sensor shaft to a drive motor controller of the mower to drive an electric motor based on the signal.

20 Claims, 9 Drawing Sheets

(56) References Cited

U.S. PATENT DOCUMENTS

| | | | | |
|---|---|---|---|---|
| 8,006,799 | B2* | 8/2011 | Yamanaka | B62D 5/006 |
| | | | | 180/444 |
| 8,240,420 | B1* | 8/2012 | Bartel | B62D 11/006 |
| | | | | 180/315 |
| 8,657,041 | B2* | 2/2014 | Ishii | B60L 15/2036 |
| | | | | 701/41 |
| 8,836,323 | B2* | 9/2014 | Most | G01B 7/30 |
| | | | | 324/207.25 |
| 8,905,895 | B2* | 12/2014 | Scalf | G01L 5/221 |
| | | | | 74/606 R |
| 9,114,798 | B1* | 8/2015 | Fox | F04B 1/26 |
| 9,764,734 | B1* | 9/2017 | Brown | B60W 30/143 |
| 10,118,688 | B2* | 11/2018 | Voiles | B64C 13/343 |
| 10,124,673 | B2* | 11/2018 | Kouzuma | G05G 5/03 |
| 10,150,503 | B1* | 12/2018 | Laymon | B60K 6/46 |
| 10,414,436 | B1* | 9/2019 | Bonny | A01D 69/02 |
| 10,487,805 | B2* | 11/2019 | Campbell | F16H 1/2863 |
| 10,850,622 | B2* | 12/2020 | Matsuda | B60L 7/24 |
| 10,919,463 | B1* | 2/2021 | Brown | H04W 4/48 |
| 10,955,051 | B2* | 3/2021 | Jeon | F16H 1/203 |
| 10,960,925 | B2* | 3/2021 | Fujiki | B62D 11/08 |
| 11,032,973 | B2* | 6/2021 | Conrad | A01D 34/685 |
| 11,172,604 | B2* | 11/2021 | Yang | G01D 5/06 |
| 11,427,091 | B1* | 8/2022 | Thompson | A01D 34/006 |
| 11,427,250 | B2* | 8/2022 | Chae | B62D 3/02 |
| 11,589,513 | B2* | 2/2023 | Reese | A01D 34/64 |
| 11,787,471 | B1* | 10/2023 | Probst | B62D 11/04 |
| | | | | 56/10.8 |
| 11,888,378 | B1* | 1/2024 | Bonny | H02K 7/116 |
| 2005/0057031 | A1* | 3/2005 | Ahnafield | B60T 7/10 |
| | | | | 280/771 |
| 2013/0015005 | A1* | 1/2013 | Koga | B60L 7/26 |
| | | | | 180/6.48 |
| 2016/0302356 | A1* | 10/2016 | Haun | B62D 11/24 |
| 2018/0041097 | A1* | 2/2018 | Kanahama | H02K 7/125 |
| 2019/0195339 | A1* | 6/2019 | Kim | F16H 59/044 |
| 2020/0390031 | A1 | 12/2020 | Yang et al. | |
| 2021/0039501 | A1* | 2/2021 | Matsuda | A01D 34/66 |
| 2021/0316785 | A1* | 10/2021 | Ogura | A01D 34/824 |
| 2022/0097664 | A1 | 3/2022 | Bagwell et al. | |
| 2022/0287233 | A1* | 9/2022 | Feldkamp | A01D 34/824 |
| 2024/0270310 | A1* | 8/2024 | Sharma | B62D 1/12 |
| 2024/0383524 | A1* | 11/2024 | Ray | A01D 69/02 |

* cited by examiner

SENSOR ASSEMBLY FOR A STEERING CONTROL LEVER OF A MOWER

CROSS REFERENCE TO RELATED APPLICATION

The present application claims priority to U.S. Provisional Patent Application No. 63/484,765 filed on Feb. 14, 2023, the entire contents of which are herein incorporated by reference as if fully set forth in this description.

BACKGROUND

Conventional mowers use hydraulic drive systems for the traction (propulsion) drives. Either direct drive pumps, or pump and gearbox combinations are typically used.

Lap bars (e.g., steering control levers) are used to control the speed and direction of the mower. In traditional mowers, left and right lap bars are mechanically connected to left and right hydraulic controls such as a swash plate of a respective hydraulic pump. As a user of the mower presses a lap bar forward, the lap bar physically moves a respective swash plate. As the swash plate is moved, hydraulic fluid flows to a corresponding hydraulic motor, and causes rotation of the hydraulic motor. The hydraulic motor may be connected to a gear reducer or directly to a wheel of the mower. The rotation of the hydraulic motor thus drives the wheel.

The turf market is transitioning mowers from hydraulic drive systems to electric drive systems. It may thus be desirable to have the lap bars output an electronic signal indicative of their position to the electric motors to drive the mower. It is with respect to these and other considerations that the disclosure made herein is presented.

SUMMARY OF THE INVENTION

The present disclosure describes implementations that relate to a sensor assembly for a steering control lever of a mower.

In a first example implementation, the present disclosure describes a sensor assembly. The sensor assembly includes: a rotary displacement amplifier configured to be coupled to a lap bar of a mower and configured to amplify movement of the lap bar; and a rotary sensor comprising a sensor shaft coupled to, and rotatable by, the rotary displacement amplifier, wherein the rotary displacement amplifier is configured to transmit an amplified movement of the lap bar to the sensor shaft, and wherein the rotary sensor is configured to provide a signal indicative of a rotary position of the sensor shaft to a drive motor controller of the mower to drive an electric motor based on the signal.

In a second example implementation, the present disclosure describes a mower. The mower includes: an electric motor configured to drive a wheel of the mower; a drive motor controller configured to control the electric motor; a lap bar configured to be moved by an operator to drive the mower; and a sensor assembly of the first example implementation coupled to the lap bar of the mower.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

The turf market is transitioning mowers (e.g., zero-turn radius (ZTR) mowers) from hydrostatic ground drive and belt driven mower decks to electric drives for all functions. A mower with electric drives can have an electronic control system and a drive-by-wire configuration where a machine user interface, such as a lap bar (e.g., steering control lever), is used to output an electric signal indicative of a position of the lap bar to the electronic control system.

For example, if an operator moves the lap bar, causing it to rotate about a given axis, a signal indicative of a rotary position of the lap bar is provided to a motor controller. The motor controller can responsively control an electric motor propelling the mower based on the signal from the lap bar.

In such systems, it may be desirable to detect small movements of the lap bar to enable the operator of the mower to control movement of the mower in a precise manner. Rotary encoders with high resolution and low backlash can be costly, and might thus not be suitable to a cost-sensitive product in the turf market. Typical low cost rotary motion sensors have a larger hysteresis band and lower resolution than required to react to the small movements of the lap bars of a mower.

Particularly, lap bars of a mower are at a disadvantage because of the long lever arm of such lap bars. Small movements at the end of a lap bar (e.g., typically 20 to 26 inches from the rotation axis of the lap bar) are hard to detect when a sensor has significant hysteresis and low resolution. It may thus be desirable to have a rotary sensor capable of detecting small movements of the lap bars, while having a reasonable cost compared to high end rotary encoders.

Disclosed herein are system, assemblies, and methods associated with a rotary sensor configured to detect movements of a lap bar of a mower. An example disclosed sensor assembly includes a rotary displacement amplifier that is connected to the lap bar. Small movements of the lap bar by the operator are amplified by the rotary displacement amplifier to render the sensor sensitive to small movement of the lap bar, increase resolution, and reduce hysteresis of the sensor.

Figure 1:
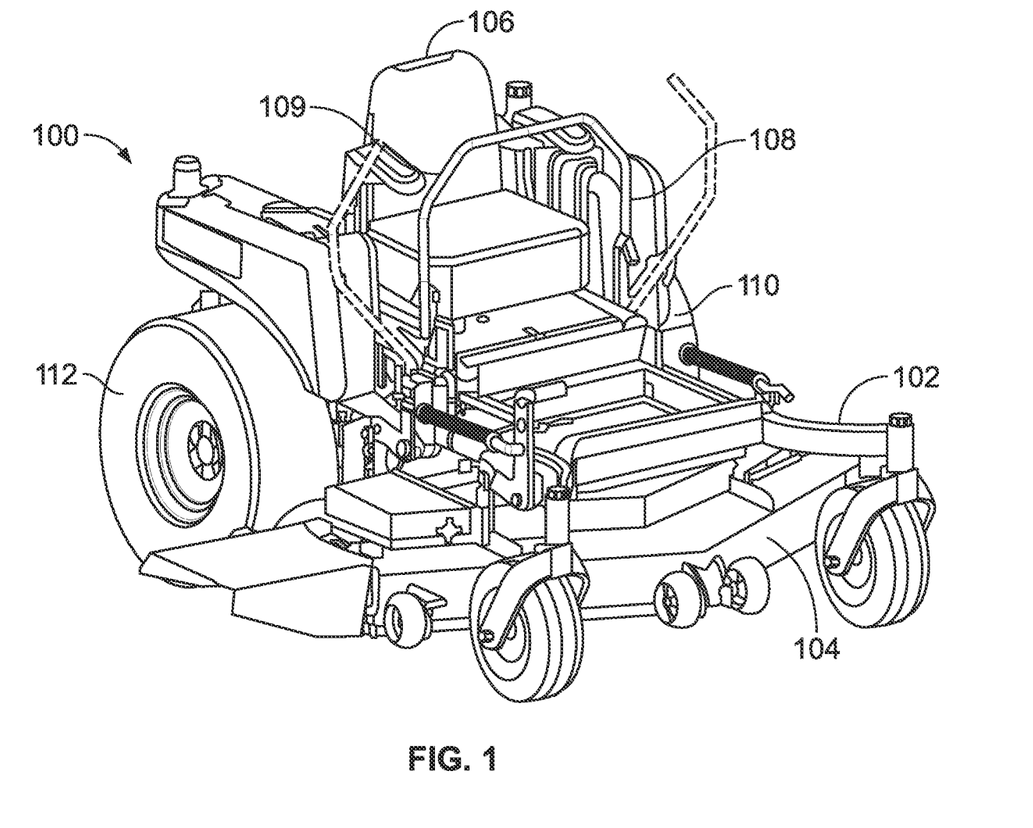
FIG. 1 illustrates a perspective view of a mower, in accordance with an example implementation.

FIG. 1 illustrates a perspective view of a mower 100, in accordance with an example implementation. The mower 100 can be, for example, a ZTR mower (e.g., a lawn mower with a turning radius that is effectively zero).

The mower 100 includes a frame 102. The mower 100 also includes a mower deck 104 supported by the frame 102. The mower deck 104 can house one or more blades (e.g., three blades) for mowing grass, for example. The mower 100 further includes an operator seat 106 for the operator to sit on while operating the mower 100.

The mower 100 also includes a lap bar 108 and a lap bar 109 for operating the mower 100. The lap bars 108, 109 can also be referred to as steering control levers.

In examples, a rear mounted engine (not shown) can be mounted to the frame 102 behind the operator seat 106. The engine can be an internal combustion engine configured to drive a power generator. The power generator then provides electric power to one or more electric motors that drive respective rear wheels such as left wheel 110 and right wheel 112 that propel the mower 100, for example. The power generator can also provide power to electric motors that drive the blades of the mower deck 104.

In another example, rather than using an engine and a power generator, the mower 100 can be a battery-driven vehicle. Particularly, the mower 100 can have a rechargeable battery that provides electric power to drive the various motors.

The lap bars 108, 109 can be configured to control speed and direction of the wheels 110, 112 via actuating the respective electric motors. Thus, the operator can use the lap bars 108, 109 to drive the wheels 110, 112, independently, to propel the mower 100. The configuration of the mower 100 is an example configuration and it should be understood that other mower configurations and vehicle types could be used.

Figure 2:
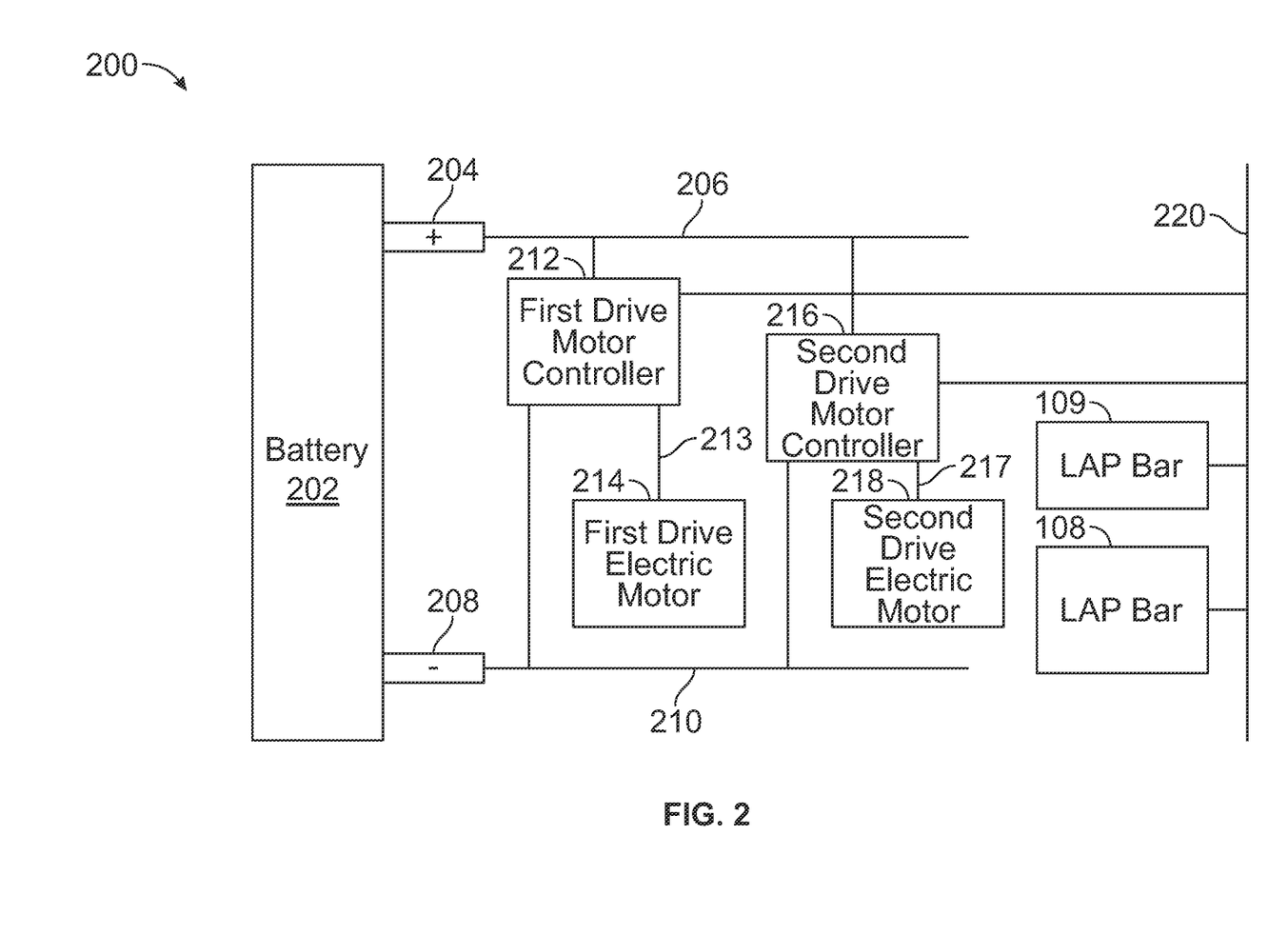
FIG. 2 illustrates a block diagram of a control system of a mower, in accordance with an example implementation.

FIG. 2 illustrates a block diagram of a control system 200 of a mower, in accordance with an example implementation. The control system 200 includes a battery 202. A battery is used herein as an example source of direct current (DC) power. However, it should be understood that other sources of electric power, such as a combination of a combustion engine driving a power generator, could be used.

The battery 202 can have a positive DC voltage terminal 204 connected to a positive DC voltage bus 206. The battery 202 can also have a negative DC voltage terminal 208 (e.g., electrical ground) connected to a negative DC voltage bus 210. The positive DC voltage bus 206 and the negative DC voltage bus 210 provide DC electric power to various motor controllers.

Particularly, the control system 200 can include a first drive motor controller 212 configured to drive a first drive electric motor 214 that propels the left wheel 110, for example. The control system 200 also includes a second drive motor controller 216 configured to drive a second drive electric motor 218 that propels the right wheel 112, for example. The control system 200 can include other motor controllers and respective electric motors to spin the blades of the mower deck 104, for example.

In an example, each of the motor controllers (e.g., the first drive motor controller 212 and the second drive motor controller 216) can include a controller and an inverter. The inverter can be configured as a power converter that converts DC power received at the inverter (e.g., received from the battery 202 via the positive DC voltage bus 206 and the negative DC voltage bus 210) to three-phase, alternating current (AC) power that can be provided to wire windings of a stator of the respective electric motor to drive the electric motor. The controller may have a microprocessor that provides a pulse width modulated (PWM) signal to operate the power converter of the inverter, for example.

As such, the first drive motor controller 212 receives DC power from the battery 202 and provides three-phase AC power to the first drive electric motor 214 via a cable 213. Further, the first drive electric motor 214 can include a variety of sensors (e.g., temperature sensor, current sensors, speed sensors, position sensors, etc.) that provide sensor feedback to the first drive motor controller 212 via the cable 213. Similarly, the second drive motor controller 216 can be electrically coupled to the second drive electric motor 218 via a cable 217.

Using a network-based control architecture may advantageously reduce complexity of the mower 100. Such network-based control architecture allows any and all of the plurality of connected devices of a vehicle to communicate instantaneously and directly with any and all of the other connected devices on the network, with less wiring.

As such, the control system 200 is depicted as a network-based control system. Particularly, rather than having components connected to each other directly, components of the control system 200 are connected directly to a communication bus 220, and communicate continually and directly with each other via the communication bus 220.

For example, the lap bar 108 and the lap bar 109 are connected via respective wires to the communication bus 220, and are configured to broadcast signals/messages indicating their status/position on the communication bus 220. The messages from the lap bars 108, 109 may operate as throttle indicators or commands (e.g., a count between 0 and 4000 to indicate a commanded speed within a range of possible speeds). In other examples, the lap bars 108, 109 may output an analog signal (e.g., between 0 and 5 volts) to indicate their position, and thus the commanded speed. In another example, a pulse width modulated signal (e.g., a percentage of voltage) or current can be used can be output by the lap bars 108, 109.

The first drive motor controller 212 is also connected to the communication bus 220 and receives the message from the lap bar 108 via the communication bus 220. Similarly, the second drive motor controller 216 is also connected to the communication bus 220 and receives the message from the lap bar 109 via the communication bus 220. The drive motor controllers 212, 216 then control their respective electric motors according to the messages received via the communication bus 220 from the lap bars 108, 109.

As an example, the communication bus 220 can be any type of a serial communication bus such as a controller area network (CAN) bus, a universal serial bus (USB), ETHERCAT, etc. In an example, the communication bus 220 is part of a communication network (e.g., a CAN network) that involves a message-based protocol allowing direct communication between various devices/components of the mower 100.

In other examples, however, the lap bars 108, 109 can provide an analog signal (e.g., 0 to 5 volts), a PWM (e.g., a percentage of voltage), or an electric current.

For each device, the data in a data frame is transmitted serially in such a way that if more than one device transmits at the same time, the highest priority device can continue while the other devices can back off sending their messages. Data frames are received by all devices, including by the transmitting device. With this configuration, all of the plurality of connected devices of the control system 200 can communicate substantially instantaneously with any and all of the other devices connected to the communication bus 220. Other communication protocols that could be used include Local Interconnect Network (LIN), Inter-Integrated Circuit (I2C), Serial Peripheral Interface (SPI), Universal Asynchronous Receiver/Transmitter (UART), CAN OPEN, RS-485, Ether for Control Automation Technology (Ether CAT), etc. Wireless communication protocols could also be used, such as Bluetooth®, ANT+, WiFi, etc.

In other examples, however, rather than using a network-based control architecture, components of the control system 200 can be directly wired to each other. For example, the lap bar 108 can be directly wired to the first drive motor controller 212, and the lap bar 109 can be directly wired to the second drive motor controller 216.

As mentioned above, it may be desirable to be able to detect small movements of the lap bars 108, 109, and output a signal or message to the communication bus 220 indicative of such small movements. This way, the drive motor controllers 212, 216 can respond to such small movements and enable the operator to control movement of the mower 100 in a precise manner. As such, each of the lap bars 108, 109 can be coupled to respective sensor assembly configured to detect rotary movement of the respective lap bar, and broadcast information (signal or message) to the communication bus 220 indicative of the rotary position of the respective lap bar.

Figure 3:
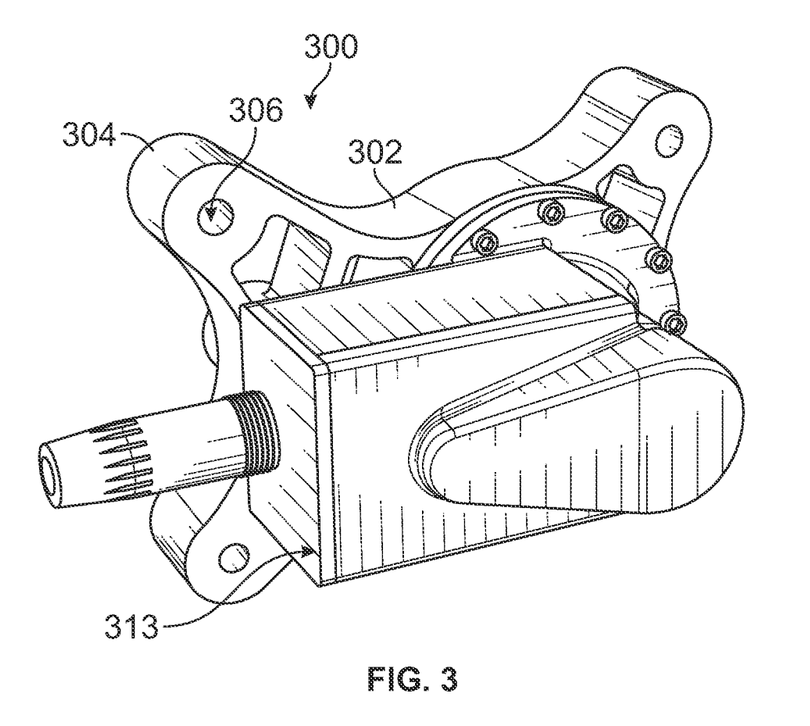
FIG. 3 illustrates a perspective view of a sensor assembly, in accordance with an example implementation.
Figure 4:
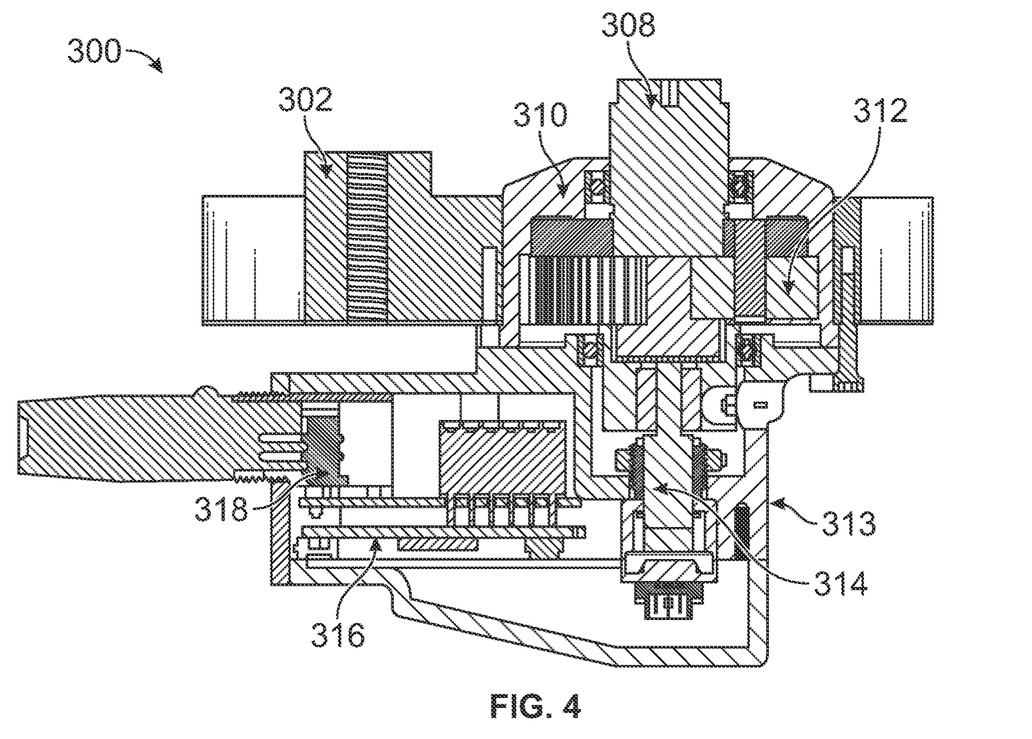
FIG. 4 illustrates a cross-sectional top view of the sensor assembly of FIG. 3, in accordance with an example implementation.

FIG. 3 illustrates a perspective view of a sensor assembly 300, and FIG. 4 illustrates a cross-sectional top view of the sensor assembly 300, in accordance with an example implementation. The sensor assembly 300 can have an adapter 302 (e.g., a flange or bracket) that facilitates mounting the sensor assembly 300 to the mower 100 (e.g., to the frame 102 of the mower 100). For example, the adapter 302 can have several ears such as ear 304 that has a hole 306 through which a fastener can be disposed to couple the sensor assembly 300 to the frame 102. The adapter 302 can made of aluminum, for example.

As shown in FIG. 4, the sensor assembly 300 has an input shaft 308 that is configured to be coupled to a lap bar (e.g., the lap bar 108 or the lap bar 109). Thus, the input shaft 308 rotates when the lap bar is actuated or moved by the operator of the mower 100.

The input shaft 308 extends into an amplifier housing 310, which contains or houses a rotary displacement amplifier 312. As described in more details below, the rotary displacement amplifier 312 is configured to amplify rotary movements of the input shaft 308, which is coupled to a lap bar.

The sensor assembly 300 further includes a sensor module 313 having a rotary sensor 314 configured to sense the amplified rotary movement and provide a signal to sensor electronics 316. The sensor electronics 316 processes the signal from the rotary sensor 314 and provides an output signal via an output connector 318 (e.g., a four-pin connector) to the communication bus 220, for example. The output connector 318 can also provide electric power to the sensor electronics 316 (e.g., positive, negative, and ground connections).

Figure 5:
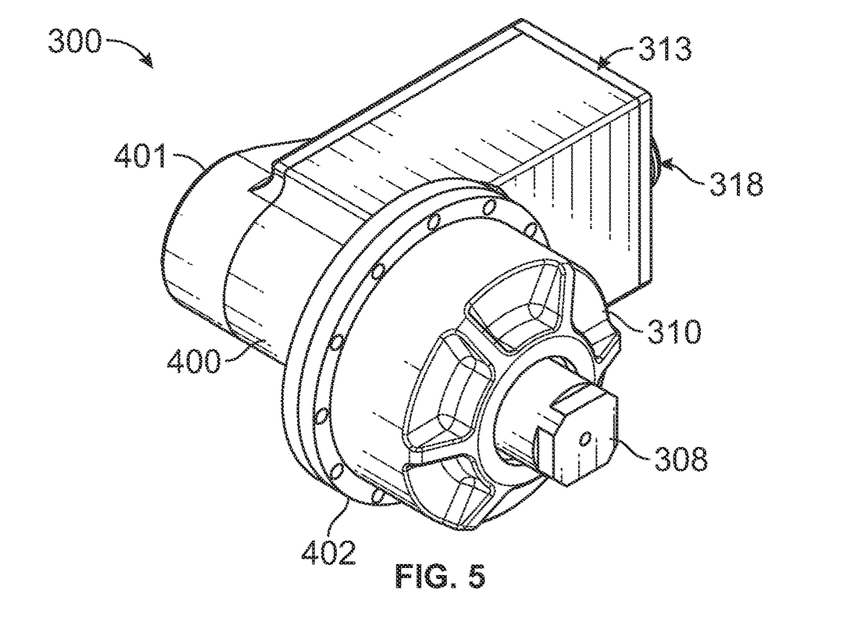
FIG. 5 illustrates a partial perspective view of the sensor assembly of FIG. 3, in accordance with an example implementation.
Figure 6:
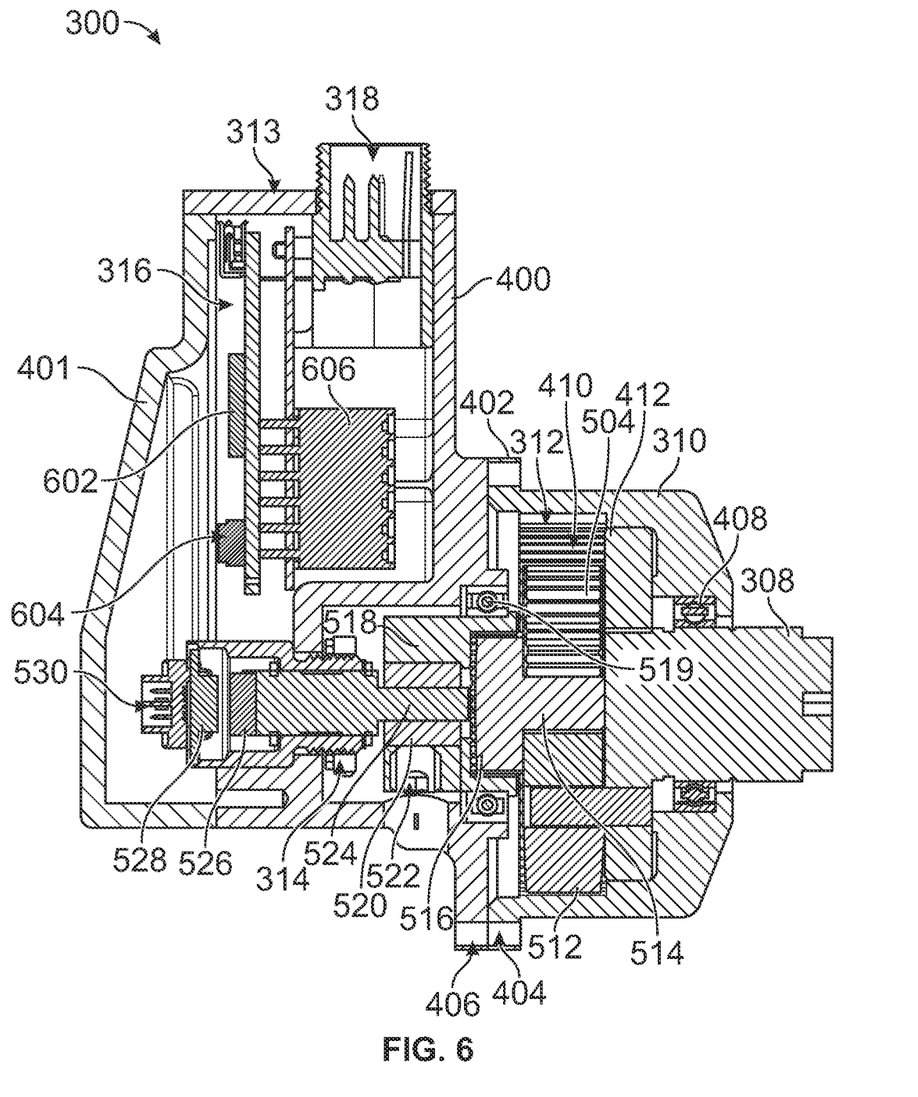
FIG. 6 illustrates a cross-sectional view of the sensor assembly shown in FIG. 5, in accordance with an example implementation.

FIG. 5 illustrates a partial perspective view of the sensor assembly 300, in accordance with an example implementation. Particularly, FIG. 5 illustrates the sensor assembly 300 without the adapter 302 to reduce visual clutter in the drawing. FIG. 6 illustrates a cross-sectional view of the sensor assembly 300 shown in FIG. 5, in accordance with an example implementation.

The sensor module 313 includes a sensor module housing 400 and a cover 401.

The sensor module housing 400 and the cover 401 form an enclosure in which the sensor electronics 316 and the rotary sensor 314 are disposed.

As depicted in FIG. 6, the amplifier housing 310 is coupled to the sensor module housing 400 of the sensor module 313. For example, the amplifier housing 310 can have a flange 402 having a plurality of holes, such as hole 404, formed in a circular array about the flange 402. The sensor module housing 400 can have corresponding holes such as hole 406 that align with the holes of the flange 402. Fasteners (e.g., bolts) can be disposed through such aligned holes to couple the amplifier housing 310 to the sensor module housing 400.

As shown in the cross-sectional view of FIG. 6, the sensor assembly 300 includes a bearing 408 that supports the input shaft 308 and allows the input shaft 308 to rotate relative to the amplifier housing 310. In the example implementation shown in FIG. 6, the rotary displacement amplifier 312 comprises a planetary gear set 410, and the input shaft 308 is coupled to or integrated with a planetary carrier 412 of the planetary gear set 410.

Figure 7:
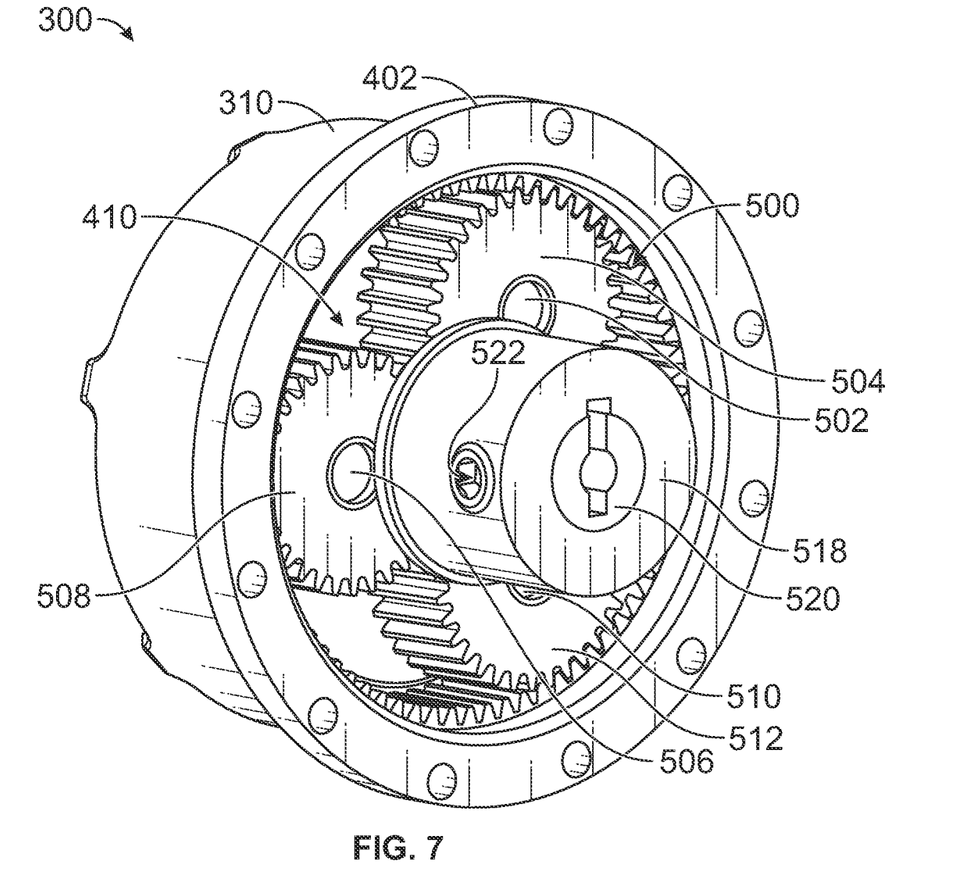
FIG. 7 illustrates a partial perspective view of the sensor assembly showing an amplifier housing and a planetary gear set, in accordance with an example implementation.
Figure 8:
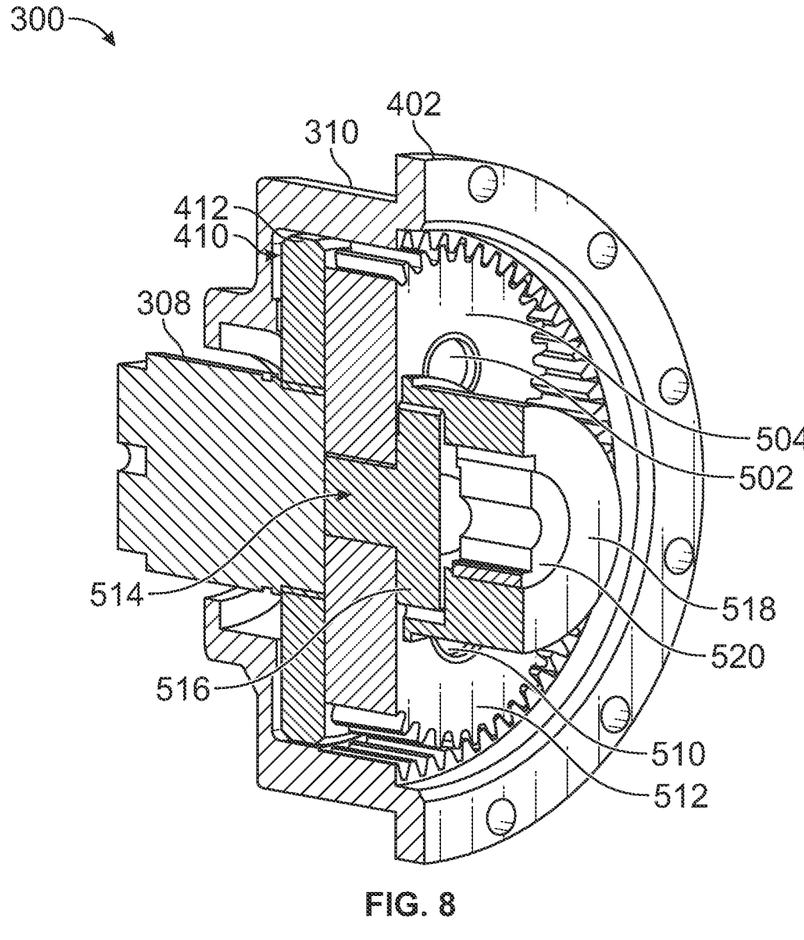
FIG. 8 illustrates a perspective cross-sectional view of the sensor assembly depicted in FIG. 7, in accordance with an example implementation.
Figure 9:
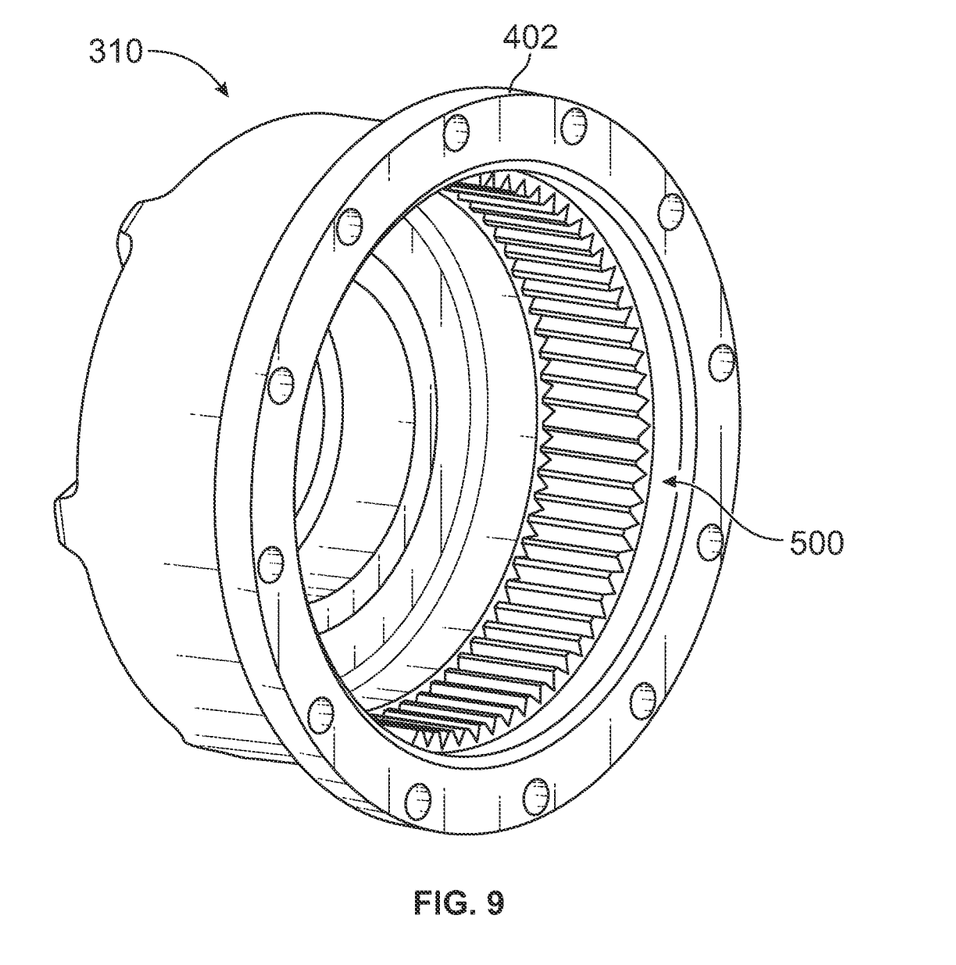
FIG. 9 illustrates a perspective view of the amplifier housing shown in FIG. 7, in accordance with an example implementation.

FIG. 7 illustrates a partial perspective view of the sensor assembly 300 showing the amplifier housing 310 and the planetary gear set 410, and FIG. 8 illustrates a perspective cross-sectional view of the sensor assembly 300 depicted in FIG. 7, in accordance with an example implementation. FIG. 9 illustrates a perspective view of the amplifier housing 310, in accordance with an example implementation. As shown in FIGS. 7-9, the amplifier housing 310 has internal teeth formed on an interior peripheral surface of the amplifier housing 310 to form a ring gear 500 that interacts with planet gears of the planetary gear set 410.

The amplifier housing 310 is stationary as it is coupled to the sensor module housing 400. Thus, the ring gear 500 is stationary.

Referring to FIGS. 7-8 together, the planetary gear set 410 includes the planetary carrier 412, which is coupled to or integrated with the input shaft 308, and the planetary carrier 412 has three pins protruding therefrom to engage planetary gears of the planetary gear set 410. Particularly, a pin 502 of the planetary carrier 412 engages a planet gear 504, a pin 506 of the planetary carrier 412 engages a planet gear 508, and a pin 510 of the planetary carrier 412 engages a planet gear 512. With this configuration, as the input shaft 308 rotates with a lap bar (e.g., the lap bar 108 or the lap bar 109), the planetary carrier 412 rotates, and the planet gears 504, 508, 512 rotate or turn therewith.

The planet gears 504, 508, 512 have external gear teeth that engage internal gear teeth of the ring gear 500 (which is stationary) as shown in FIGS. 7-8, and therefore, the planet gears 504, 508, 512 spin about their own axes in an opposite direction to the rotation direction of the input shaft 308 and the planetary carrier 412. For example, if the input shaft 308 and the planetary carrier 412 rotate in a clockwise direction, the planet gears 504, 508, 512 turn with the planetary carrier 412 in the clockwise direction, but spin about their own axes in a counter-clockwise direction.

As shown in FIG. 8, the planetary gear set 410 further includes a sun gear 514 disposed at a center of the planetary gear set 410. The sun gear 514 has external gear teeth that engage the external gear teeth of the planet gears 504, 508, 512. Thus, as the planet gears 504, 508, 512 turn and spin, they cause the sun gear 514 to rotate in the same rotational direction as the input shaft 308 and the planetary carrier 412. The rotation of the sun gear 514 is, however, amplified compared to the rotation of the input shaft 308.

Particularly, the planetary gear set 410 amplifies the rotational movement of the input shaft 308, which is coupled to a lab bar of the mower 100. For example, the number of teeth of the gears of the planetary gear set 410 can be selected such that a desired amplification ratio (e.g., 10:1) is achieved. As a particular example, the planet gears 504, 508, 512 can each have 32 teeth and the sun gear 514 can have 8 teeth, and thus an amplification ratio of 10:1 can be achieved.

With an amplification ratio of 10:1, a 2 degree movement/rotation of the lap bar and the input shaft 308 causes the sun gear 514 to rotate 20 degrees. As described below, motion of the sun gear 514 is transmitted to the rotary sensor 314, and therefore the rotational movement of a rotary element of the rotary sensor 314 is increased (amplified) compared to the rotational movement of the lap bars, rendering the rotary sensor 314 sensitive to fine movements of the lap bar.

In addition, if the mower 100 begins to move and the operator pulls back on the lap bars a slight amount (e.g., 0.2 degrees) in an attempt to slow acceleration of the mower 100 and to reduce the amplitude of the command signal, the sun gear 514 moves 2 degrees due to amplification by the planetary gear set 410. Such amplified motion is transmitted to the rotary sensor 314, which in turn provides output signals to a drive motor controller. This way, the drive motor controller can respond to fine movements of the lap bar.

As shown in FIG. 8, the sun gear 514 has a flange 516 extending axially beyond the plane of the planet gears 504, 508, 512 to engage a coupler 518. The sun gear 514 engages with the coupler 518 such that as the sun gear 514 rotates, the coupler 518 rotates therewith.

For example, the flange 516 may have external gear teeth and the coupler 518 may have corresponding internal gear teeth that engage the external gear teeth of the flange 516. This way, the sun gear 514 and the coupler 518 are rotationally coupled. As shown in FIG. 6, the coupler 518 is a floating component (not fixed) that is supported by a bearing 519, which allows the coupler 518 to rotate relative to the sensor module housing 400 as the sun gear 514 rotates. It should be understood that the flange 516 and the coupler 518 can be rotationally coupled in other ways. Any other coupling mechanism (e.g., screw, spline, self-holding taper arrangement, etc.) could be used.

The sensor assembly 300 further includes a clamping bushing 520 disposed within the coupler 518, and the coupler 518 is configured to transmit torque from the sun gear 514 to the clamping bushing 520. Particularly, as shown in FIGS. 6, 7, the sensor assembly 300 has a set screw 522 that is screwed through the wall of the coupler 518 and reaches the clamping bushing 520. The clamping bushing 520 can be a split bushing as shown in FIG. 7, and thus the clamping bushing 520 can be tightened to reduce its inner diameter by driving the set screw 522 inward.

As shown in FIG. 6, the rotary sensor 314 has a sensor shaft 524 that is disposed partially within the clamping bushing 520 and rotatable by the rotary displacement amplifier 312. Particularly, the clamping bushing 520 clamps on the sensor shaft 524 of the rotary sensor 314 as the set screw 522 is screwed inward. With this configuration, the sensor shaft 524 is coupled to and rotates with the coupler 518, which in turn is coupled to and rotates with the sun gear 514. As such, the sensor shaft 524 is rotatable by with the sun gear 514, and therefore the rotational movement of the sensor shaft 524 is amplified compared to the rotational movement of the lap bar and the input shaft 308.

As shown in FIG. 6, the rotary sensor 314 can be configured as a Hall-Effect sensor having a magnet 526 coupled to the sensor shaft 524 and rotates therewith. The rotary sensor 314 can also have a sensor chip 528 that detects variation in the magnetic field of the magnet 526 as it rotates with the sensor shaft 524. Based on the variation in the magnetic field, the sensor chip 528 outputs a respective signal indicative of a rotational position of the sensor shaft 524. The rotary sensor 314 can have a sensor connector 530 through which the output signal from the sensor chip 528 is provided to the sensor electronics 316.

Figure 10:
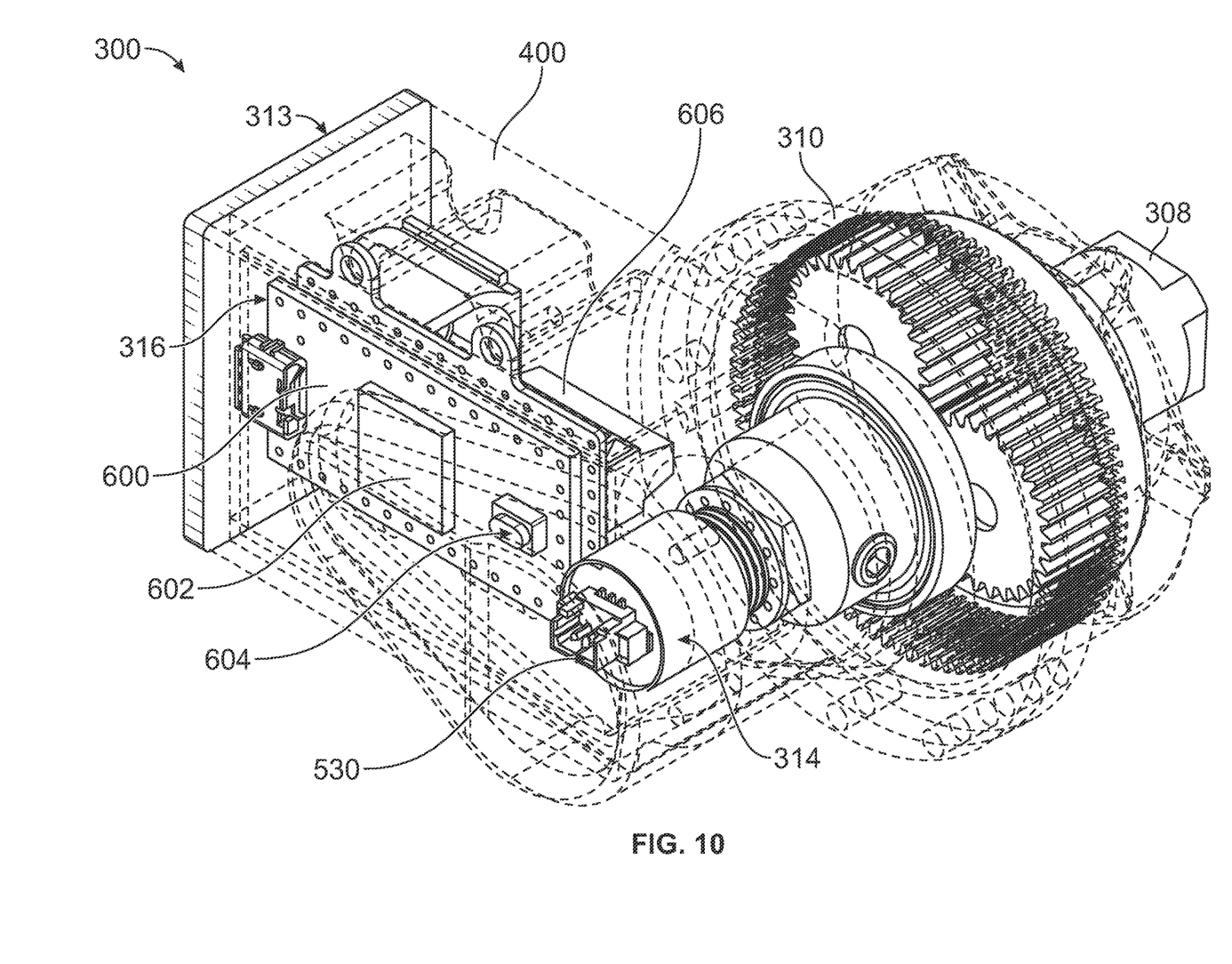
FIG. 10 illustrates a transparent perspective view of the sensor assembly shown in FIG. 3, in accordance with an example implementation.

FIG. 10 illustrates a transparent perspective view of the sensor assembly 300, in accordance with an example implementation. Referring to FIGS. 6, 10 together, the sensor electronics 316 can have a printed circuit board (PCB) 600. A PCB mechanically supports and electrically connects electronic components (e.g., microprocessors, integrated chips (ICs) such as chip 602, capacitors, resistors, etc.) using conductive tracks, pads, and other features etched from one or more sheet layers of copper laminated onto and/or between sheet layers of a non-conductive substrate. Components are generally soldered onto the PCB to both electrically connect and mechanically fasten them to it.

The PCB 600 can have a board connector 604, which can be connected via wires (not shown) to the sensor connector 530. Thus, the output signal from the rotary sensor 314 can be provided through the sensor connector 530 to the board connector 604. Such signal can then be provided to other components (e.g., the chip 602) of the PCB 600 for processing.

The sensor electronics 316 can further include a connector 606 that can receive processed signals generated by the chip 602, for example. The connector 606 can also be connected via wires (not shown) to the output connector 318, which is electrically coupled to a controller of the mower 100 or to the communication bus 220 as mentioned above. In an example, the PCB 600 can also include a CAN transceiver configured to convert raw information (the output signal) from the rotary sensor 314 to a CAN message.

With this configuration, the output signal indicative of a rotary position of the sensor shaft 524 (which is the rotary position of the sun gear 514) can be provided to a drive motor controller of the drive motor controllers 212, 216 to drive a corresponding electric motor accordingly. The rotary travel of the sensor shaft 524 is amplified relative to the movement of the lap bar as described above, and thus the sensor shaft 524 may pass through a typical band of hysteresis, causing the motor controller and the electric motor to respond to fine movements (e.g., movements less than a threshold rotary travel such as 0.5 degrees) of the lap bar. This way, the mower 100 or the control system 200 can respond as predicted in a precise manor, rather than respond with a delayed or lagging feeling from a typical 1:1 low cost sensor with a wide hysteresis band.

Many combinations of gear configurations can be implemented to achieve desired amplification ratios based on the total target sensor rotation, the desired range of input rotation, for example. Although in the configuration described above, the input shaft 308 is coupled to the planetary carrier 412 and the output is the sun gear 514, other configurations can be used. For example, the input shaft 308 could be coupled to the sun gear 514 and the output movement may be that of the planetary carrier 412. In other examples, the ring gear 500 might not be stationary, and might be used as an input or output member. In other example implementations, other types of amplifiers (e.g., other type of gear amplifiers other than a planetary gear set) could be implemented to achieve rotary movement amplification. For instance, belt or chain reduction configurations, where belts or chains drive sprockets of different diameters, could be used.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiment (EEEs) listed below.

EEE 1 is a sensor assembly comprising: a rotary displacement amplifier configured to be coupled to a lap bar of a mower and configured to amplify movement of the lap bar; and a rotary sensor comprising a sensor shaft coupled to, and rotatable by, the rotary displacement amplifier, wherein the rotary displacement amplifier is configured to transmit an amplified movement of the lap bar to the sensor shaft, and wherein the rotary sensor is configured to provide a signal indicative of a rotary position of the sensor shaft to a drive motor controller of the mower to drive an electric motor based on the signal.

EEE 2 is the sensor assembly of EEE 1, further comprising: an input shaft configured to be coupled to the lap bar, such that movement of the lap bar causes the input shaft to rotate, and wherein the rotary displacement amplifier is configured to amplify rotary movement of the input shaft.

EEE 3 is the sensor assembly of EEE 2, wherein the rotary displacement amplifier comprises: a planetary gear set coupled to the sensor shaft, wherein the planetary gear set amplifies rotary movement of the input shaft, and transmits amplified rotary movement of the input shaft to the sensor shaft.

EEE 4 is the sensor assembly of EEE 3, wherein the planetary gear set comprises: a planetary carrier coupled to the input shaft; a plurality of planet gears configured to rotate with the planetary carrier, wherein each planet gear of the plurality of planet gears is configured to spin about an axis thereof as the planetary carrier rotates; and a sun gear that engages the plurality of planet gears.

EEE 5 is the sensor assembly of EEE 4, wherein the sensor shaft is coupled to the sun gear.

EEE 6 is the sensor assembly of any of EEEs 4-5, wherein the sensor assembly further comprises: an amplifier housing configured to contain the planetary gear set, wherein the amplifier housing comprises internal teeth formed on an interior peripheral surface of the amplifier housing to form a ring gear that interacts with the planet gears of the planetary gear set.

EEE 7 is the mower of any of EEEs 4-6, further comprising: a coupler coupled to the sun gear and configured to transmit a rotary movement of the sun gear to the sensor shaft.

EEE 8 is the sensor assembly of EEE 7, further comprising: a clamping bushing disposed within the coupler, wherein the sensor shaft is disposed partially within the clamping bushing, and wherein the clamping bushing is configured to clamp on the sensor shaft to transmit the rotary movement of the sun gear and the coupler to the sensor shaft.

EEE 9 is the sensor assembly of EEE 8, wherein the clamping bushing is configured as a split bushing, and wherein the sensor assembly further comprises: a set screw configured to be driven through the coupler, to reach and clamping bushing, causing the clamping bushing to clamp on the sensor shaft.

EEE 10 is the sensor assembly of any of EEEs 1-9, further comprising: an amplifier housing configured to contain the rotary displacement amplifier; a sensor module housing coupled to the amplifier housing; a cover coupled to the sensor module housing, wherein the sensor module housing and the cover form an enclosure; and sensor electronics comprising a printed circuit board disposed within the enclosure.

EEE 11 is the sensor assembly of EEE 10, further comprising: a magnet coupled to the sensor shaft; and a sensor chip configured to detect variation in magnetic field of the magnet as the sensor shaft rotates, and output a respective signal indicative of the rotary position of the sensor shaft to the sensor electronics.

EEE 12 is a mower comprising: an electric motor configured to drive a wheel of the mower; a drive motor controller configured to control the electric motor; a lap bar configured to be moved by an operator to drive the mower; and a sensor assembly coupled to the lap bar, wherein the sensor assembly comprises: a rotary displacement amplifier coupled to the lap bar and configured to amplify movement of the lap bar, and a rotary sensor comprising a sensor shaft coupled to, and rotatable by, the rotary displacement amplifier, wherein the rotary displacement amplifier is configured to transmit an amplified movement of the lap bar to the sensor shaft, and wherein the rotary sensor is configured to provide a signal indicative of a rotary position of the sensor shaft to the drive motor controller to drive the electric motor based on the signal.

EEE 13 is the mower of EEE 12, further comprising: a frame, wherein the sensor assembly further comprises an adapter that facilitates coupling the sensor assembly to the frame of the mower.

EEE 14 is the mower of any of EEEs 12-13, wherein the sensor assembly comprises: an input shaft coupled to the lap bar, such that movement of the lap bar by the operator causes the input shaft to rotate, and wherein the rotary displacement amplifier is configured to amplify rotary movement of the input shaft to the sensor shaft.

EEE 15 is the mower of any of EEEs 12-14, wherein the rotary displacement amplifier comprises: a planetary gear set coupled to the lap bar and coupled to the sensor shaft, such that the planetary gear set amplifies rotary movement of the lap bar about a given axis, and transmits amplified rotary movement of the lap bar to the sensor shaft.

EEE 16 is the mower of EEE 15, wherein the planetary gear set comprises: a planetary carrier coupled to the lap bar; a plurality of planet gears configured to rotate with the planetary carrier, wherein each planet gear of the plurality of planet gears is configured to spin about an axis thereof as the planetary carrier rotates; and a sun gear that engages the plurality of planet gears.

EEE 17 is the mower of EEE 16, wherein the sensor assembly further comprises: an amplifier housing configured to contain the planetary gear set, wherein the amplifier housing comprises internal teeth formed on an interior peripheral surface of the amplifier housing to form a ring gear that interacts with the planet gears of the planetary gear set.

EEE 18 is the mower of any of EEEs 16-17, wherein the sensor assembly further comprises: a coupler coupled to the sun gear and configured to transmit rotary movement of the sun gear to the sensor shaft.

EEE 19 is the mower of EEE 18, wherein the sensor assembly further comprises: a clamping bushing configured as a split bushing disposed within the coupler, wherein the sensor shaft is disposed partially within the clamping bushing, and wherein the clamping bushing is configured to clamp on the sensor shaft to transmit the rotary movement of the sun gear and the coupler to the sensor shaft; and a set screw configured to be driven through the coupler, to reach and clamping bushing, causing the clamping bushing to clamp on the sensor shaft.

EEE 20 is the mower of any of EEEs 12-19, wherein the sensor assembly further comprises: an amplifier housing configured to contain the rotary displacement amplifier; a sensor module housing coupled to the amplifier housing; a cover coupled to the sensor module housing, wherein the sensor module housing and the cover form an enclosure; and sensor electronics comprising a printed circuit board disposed in the enclosure.

What is claimed is:

1. A sensor assembly comprising:
a rotary displacement amplifier configured to be coupled to a lap bar of a mower and configured to amplify movement of the lap bar; and
a rotary sensor comprising a sensor shaft coupled to, and rotatable by, the rotary displacement amplifier, wherein the rotary displacement amplifier is configured to transmit an amplified movement of the lap bar to the sensor shaft, and wherein the rotary sensor is configured to provide a signal indicative of a rotary position of the sensor shaft to a drive motor controller of the mower to drive an electric motor that propels the mower based on the signal.

2. The sensor assembly of claim 1, further comprising:
an input shaft configured to be coupled to the lap bar, such that movement of the lap bar causes the input shaft to rotate, and wherein the rotary displacement amplifier is configured to amplify rotary movement of the input shaft.

3. The sensor assembly of claim 2, wherein the rotary displacement amplifier comprises:
a planetary gear set coupled to the sensor shaft, wherein the planetary gear set amplifies rotary movement of the input shaft, and transmits amplified rotary movement of the input shaft to the sensor shaft.

4. The sensor assembly of claim 3, wherein the planetary gear set comprises:
a planetary carrier coupled to the input shaft;
a plurality of planet gears configured to rotate with the planetary carrier, wherein each planet gear of the plurality of planet gears is configured to spin about an axis thereof as the planetary carrier rotates; and
a sun gear that engages the plurality of planet gears.

5. The sensor assembly of claim 4, wherein the sensor shaft is coupled to the sun gear.

6. The sensor assembly of claim 4, wherein the sensor assembly further comprises:
an amplifier housing configured to contain the planetary gear set, wherein the amplifier housing comprises internal teeth formed on an interior peripheral surface of the amplifier housing to form a ring gear that interacts with the planet gears of the planetary gear set.

7. The mower of claim 4, further comprising:
a coupler coupled to the sun gear and configured to transmit a rotary movement of the sun gear to the sensor shaft.

8. The sensor assembly of claim 7, further comprising:
a clamping bushing disposed within the coupler, wherein the sensor shaft is disposed partially within the clamping bushing, and wherein the clamping bushing is configured to clamp on the sensor shaft to transmit the rotary movement of the sun gear and the coupler to the sensor shaft.

9. The sensor assembly of claim 8, wherein the clamping bushing is configured as a split bushing, and wherein the sensor assembly further comprises:
a set screw configured to be driven through the coupler, to reach and clamping bushing, causing the clamping bushing to clamp on the sensor shaft.

10. The sensor assembly of claim 1, further comprising:
an amplifier housing configured to contain the rotary displacement amplifier;
a sensor module housing coupled to the amplifier housing;
a cover coupled to the sensor module housing, wherein the sensor module housing and the cover form an enclosure; and
sensor electronics comprising a printed circuit board disposed within the enclosure.

11. The sensor assembly of claim 10, further comprising:
a magnet coupled to the sensor shaft; and
a sensor chip configured to detect variation in magnetic field of the magnet as the sensor shaft rotates, and output a respective signal indicative of the rotary position of the sensor shaft to the sensor electronics.

12. A mower comprising:
an electric motor configured to drive a wheel of the mower;
a drive motor controller configured to control the electric motor;
a lap bar configured to be moved by an operator to drive the mower; and
a sensor assembly coupled to the lap bar, wherein the sensor assembly comprises:
a rotary displacement amplifier coupled to the lap bar and configured to amplify movement of the lap bar, and
a rotary sensor comprising a sensor shaft coupled to, and rotatable by, the rotary displacement amplifier, wherein the rotary displacement amplifier is configured to transmit an amplified movement of the lap bar to the sensor shaft, and wherein the rotary sensor is configured to provide a signal indicative of a rotary position of the sensor shaft to the drive motor controller to drive the electric motor based on the signal.

13. The mower of claim 12, further comprising:
a frame, wherein the sensor assembly further comprises an adapter that facilitates coupling the sensor assembly to the frame of the mower.

14. The mower of claim 12, wherein the sensor assembly comprises:
an input shaft coupled to the lap bar, such that movement of the lap bar by the operator causes the input shaft to rotate, and wherein the rotary displacement amplifier is configured to amplify rotary movement of the input shaft to the sensor shaft.

15. The mower of claim 12, wherein the rotary displacement amplifier comprises:
a planetary gear set coupled to the lap bar and coupled to the sensor shaft, such that the planetary gear set amplifies rotary movement of the lap bar about a given axis, and transmits amplified rotary movement of the lap bar to the sensor shaft.

16. The mower of claim 15, wherein the planetary gear set comprises:
a planetary carrier coupled to the lap bar;
a plurality of planet gears configured to rotate with the planetary carrier, wherein each planet gear of the plurality of planet gears is configured to spin about an axis thereof as the planetary carrier rotates; and
a sun gear that engages the plurality of planet gears.

17. The mower of claim 16, wherein the sensor assembly further comprises:
an amplifier housing configured to contain the planetary gear set, wherein the amplifier housing comprises internal teeth formed on an interior peripheral surface of the amplifier housing to form a ring gear that interacts with the planet gears of the planetary gear set.

18. The mower of claim 16, wherein the sensor assembly further comprises:
a coupler coupled to the sun gear and configured to transmit rotary movement of the sun gear to the sensor shaft.

19. The mower of claim 18, wherein the sensor assembly further comprises:
a clamping bushing configured as a split bushing disposed within the coupler, wherein the sensor shaft is disposed partially within the clamping bushing, and wherein the clamping bushing is configured to clamp on the sensor shaft to transmit the rotary movement of the sun gear and the coupler to the sensor shaft; and
a set screw configured to be driven through the coupler, to reach and clamping bushing, causing the clamping bushing to clamp on the sensor shaft.

20. The mower of claim 12, wherein the sensor assembly further comprises:
an amplifier housing configured to contain the rotary displacement amplifier;
a sensor module housing coupled to the amplifier housing;
a cover coupled to the sensor module housing, wherein the sensor module housing and the cover form an enclosure; and
sensor electronics comprising a printed circuit board disposed in the enclosure.

* * * * *